(12) United States Patent
Wikström

(10) Patent No.: US 7,826,958 B2
(45) Date of Patent: Nov. 2, 2010

(54) ARRANGEMENT AND A METHOD FOR RECIRCULATION OF EXHAUST GASES OF AN INTERNAL COMBUSTION ENGINE

(75) Inventor: Hans Wikström, Johanneshov (SE)

(73) Assignee: Scania CV AB (Publ) (SE)

( * ) Notice: Subject to any disclaimer, the term of this patent is extended or adjusted under 35 U.S.C. 154(b) by 360 days.

(21) Appl. No.: 12/093,471

(22) PCT Filed: Dec. 11, 2006

(86) PCT No.: PCT/SE2006/050572

§ 371 (c)(1),
(2), (4) Date: May 14, 2008

(87) PCT Pub. No.: WO2007/073331

PCT Pub. Date: Jun. 28, 2007

(65) Prior Publication Data

US 2008/0271721 A1 Nov. 6, 2008

(30) Foreign Application Priority Data

Dec. 21, 2005 (SE) .................................. 0502847

(51) Int. Cl.
*G06F 19/00* (2006.01)
*F02M 25/07* (2006.01)
*F02B 47/08* (2006.01)
*F01P 3/12* (2006.01)

(52) U.S. Cl. ............... 701/108; 123/41.31; 123/568.12; 123/491; 701/113

(58) Field of Classification Search .............. 123/41.31, 123/179.16, 491, 568.12; 60/605.2; 701/101–103, 701/108, 113
See application file for complete search history.

(56) References Cited

U.S. PATENT DOCUMENTS

| 6,543,427 | B2 | 4/2003 | Kawasaki | |
| 6,659,069 | B2 * | 12/2003 | Shiraishi et al. | ............. 123/491 |
| 6,789,512 | B2 | 9/2004 | Duvinage et al. | |
| 7,650,753 | B2 * | 1/2010 | Muller et al. | ............ 123/41.31 |

FOREIGN PATENT DOCUMENTS

EP 0 814 255 A1 12/1997

* cited by examiner

*Primary Examiner*—Willis R Wolfe, Jr.
(74) *Attorney, Agent, or Firm*—Ostrolenk Faber LLP

(57) ABSTRACT

An arrangement and a method for recirculation of exhaust gases of a combustion engine. A return line extends from an exhaust line for engine exhaust gases to an inlet line for air to the combustion engine. An EGR valve in the exhaust line regulates the amount of exhaust gases led through the return line. A control unit controls the EGR valve. An EGR cooler cools the exhaust gases in the return line by means of a cooling system of the combustion engine. The control unit decides whether the coolant in the cooling system is at a too low a temperature and, if it is, controls the EGR valve so that a larger amount of exhaust gases is led through the return line with extra heating.

14 Claims, 2 Drawing Sheets

ARRANGEMENT AND A METHOD FOR RECIRCULATION OF EXHAUST GASES OF AN INTERNAL COMBUSTION ENGINE

CROSS REFERENCE TO RELATED APPLICATION

The present application is a 35 U.S.C. §§371 national phase conversion of PCT/SE2006/050572, filed 11 Dec. 2006, which claims priority of Swedish Application No. 0502847-7, filed 21 Dec. 2005. The PCT International Application was published in the English language.

BACKGROUND TO THE INVENTION, AND STATE OF THE ART

The present invention relates to an arrangement and a method for recirculation of exhaust gases of a combustion engine and controlling temperature of exhaust gases recirculated.

The technique called EGR (Exhaust Gas Recirculation) is a known way of leading part of the exhaust gases from a combustion process in a combustion engine back, via a return line, to an inlet line for supply of air to the combustion engine. A mixture of air and exhaust gases is thus supplied via the inlet line to the engine's combustion spaces. Adding exhaust gases to the air causes a lower combustion temperature resulting inter alia in a reduced content of nitrogen oxides $NO_x$ in the exhaust gases. This technique is used for both Otto engines and diesel engines.

The return line for exhaust gases usually comprises components such as an EGR valve which regulates the exhaust flow through the return line, and an EGR cooler for cooling the recirculating exhaust gases. An electronic control system controls the EGR valve so that a specified amount of exhaust gases is returned and is mixed with the air in the inlet line to the combustion engine. The result is a substantially optimum combustion process in the combustion engine while at the same time the formation of emissions is substantially minimised. The coolant of the combustion engine's cooling system is in many cases used for cooling the returning exhaust gases in the EGR cooler. The coolant in the combustion engine's cooling system is also commonly used for heating cab spaces in the vehicle. The coolant of a vehicle thus has a plurality of functions. For these functions to work well it is necessary that the temperature of the coolant be within a specific range, which may be 80° C.-100° C.

Conventional cooling systems usually comprise a thermostat which prevents the coolant being led to the radiator when it is at too low a temperature. Relatively rapid heating of the coolant in cooling system is thus made possible, but still more rapid heating of the radiator fluid in the cooling system would be desirable, particularly when there is a cold ambient temperature, in order to reduce the time during which cold coolant is led through the combustion engine. Leading cold coolant through the combustion engine results in excessive cooling of the combustion engine, which may inter alia lead to bad engine function, greater engine noise, increased discharge of emissions and shorter service life of the combustion engine. When there is a cold ambient temperature, more rapid heating of the coolant is also desirable to enable quicker heating of the vehicle's cab space. With a conventional arrangement it may also be difficult to maintain the temperature of the coolant when there is a cold ambient temperature and during operating periods when the combustion engine is running at low load.

SUMMARY OF THE INVENTION

The object of the present invention is to provide an arrangement and a method which make it possible to heat the coolant in a cooling system very quickly after the starting of a combustion engine and maintain a desired coolant temperature during operation even when there is a cold ambient temperature.

This object is achieved with the arrangement of the kind mentioned in the introduction which is characterised by the features indicated in the characterising part of claim 1. The coolant in the cooling system which cools the combustion engine is thus also used for cooling the returning exhaust gases in the EGR cooler. The heat exchange in the EGR cooler results in the coolant in the EGR cooler being heated by the returning exhaust gases. The degree of heating depends on the temperature of the exhaust gases and the amount of exhaust gases being led through the return line. During normal operation of the combustion engine, the amount of exhaust gases returned to the inlet line is determined in such a way as to achieve substantially optimum combustion while at the same time the formation of emissions in the form of, inter alia, nitrogen oxides is minimised. In most operating situations, however, it is possible to increase the amount of returning exhaust gases without significantly impairing the quality of the combustion processes and without considerable increase in emissions. Returning a larger amount of exhaust gases through the return line than is usually the case provides the coolant with extra heating in the EGR cooler, enabling the coolant to reach its operating temperature very quickly after the starting of the engine. This results in reduction of the period of time when cold coolant is led through the combustion engine while at the same time enabling rapid heating of the cab space in a vehicle. During, for example, periods when the combustion engine is running at low load in a cold environment, a larger amount of exhaust gases can also be returned through the return line and the EGR cooler. The coolant can thus be provided with extra heat to ensure that it can maintain an acceptable temperature level in substantially all situations when the combustion engine is in operation.

According to a preferred embodiment of the present invention, the control unit is adapted to controlling said flow means so that said larger amount of exhaust gases is led through the return line until the coolant in the cooling system has reached an acceptable temperature. Said larger amount of exhaust gases may thus be led through the return line for a relatively limited period of time, since the coolant will in most cases be heated to an acceptable temperature level relatively quickly by the extra heat thus provided. The period when the combustion process is not wholly optimum and the formation of emissions is somewhat increased can thus be limited to a relatively short time. The control unit may be adapted to controlling said flow means in such a way that said larger amount of exhaust gases takes the form of the maximum amount of exhaust gases which said flow means can lead through the return line in the prevailing operating situation. Such a maximum exhaust flow through the EGR cooler provides very rapid heating of the coolant to an acceptable temperature level.

According to another preferred embodiment of the present invention, the control unit is adapted to controlling said flow means in such a way that said larger amount of exhaust gases is limited to the largest amount of exhaust gases which it is possible to return, in the prevailing operating situation, without adversely affecting the combustion processes in the combustion engine. There is of course a limit on how large an amount of exhaust gases can be supplied in different operating states of a combustion engine without the combustion processes being affected too much in a negative direction. In this case the control unit has access to information about the largest amount of exhaust gases which can be supplied without too negatively affecting the combustion processes. Accordingly the control unit will control said flow means so that that amount of exhaust gases is returned through the return line and the EGR cooler where it heats the coolant. Alternatively the control unit may be adapted to controlling said flow means in such a way that said larger amount of exhaust gases is limited to the largest amount of exhaust gases which it is possible to return, in the prevailing operating situation, without exceeding a predetermined emission requirement. In that case the control unit has access to information about the largest amount of exhaust gases which can be supplied without the emissions exceeding said requirement. Accordingly the control unit will control said flow means in such a way that that amount of exhaust gases is returned through the return line. With advantage, the control unit has access to information about the largest possible amount of exhaust gases which can be supplied if both the requirement for acceptable combustion and the emissions requirement are to be met. Thus the control unit can control said flow means in such a way that they supply that amount of exhaust gases.

According to another preferred embodiment of the present invention, the control unit is adapted to estimating whether the coolant is at too low a temperature by comparing the temperature value received from the temperature sensor with a reference value. The temperature of the coolant may be measured in a suitable region of the cooling system. An existing temperature sensor which measures the temperature of the coolant at the outlet from the combustion engine may preferably be used. Alternatively, the temperature sensor may be so situated that it measures the temperature of the coolant inside the combustion engine. The reference value may take the form of a lowest acceptable temperature for the coolant at that position in the cooling system.

According to another preferred embodiment of the present invention, said flow means comprise an EGR valve. The EGR valve may be of a substantially conventional kind and comprise an adjustable damper by which it is possible to regulate steplessly the amount of exhaust gases passing through the return line. Said flow means may of course comprise other types of flow-regulating components such as, for example, a waste-gate valve, a turbocharger with variable geometry, a variable venturi, other types of flow-regulating components or combinations thereof.

The object indicated is also achieved with the method of the kind disclosed herein.

BRIEF DESCRIPTION OF THE DRAWINGS

Preferred embodiments of the invention are described below by way of example with reference to the attached drawings, in which.

DETAILED DESCRIPTION OF PREFERRED EMBODIMENTS OF THE INVENTION

Figure 1:
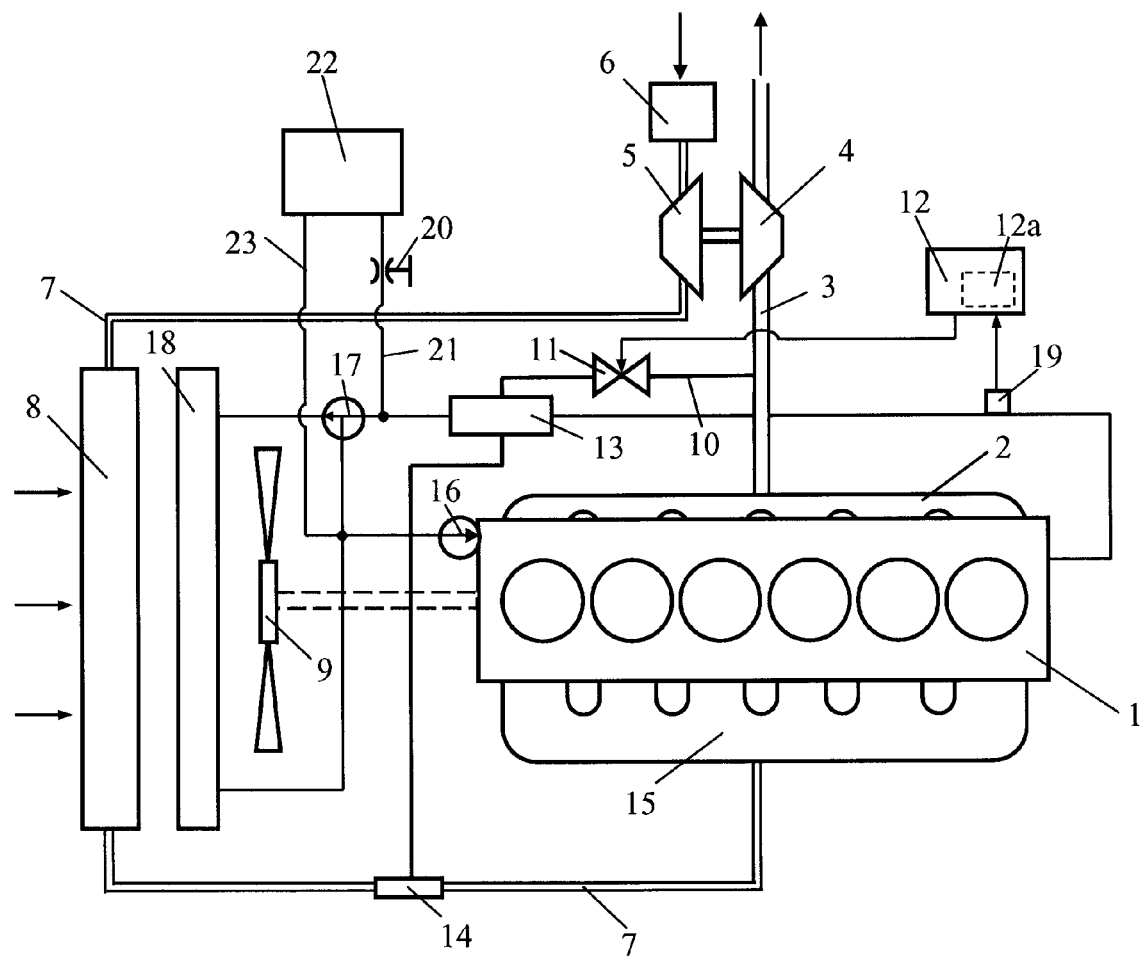
FIG. 1 depicts an arrangement for recirculation of exhaust gases of a supercharged combustion engine according to the present invention and FIG. 2 depicts a flowchart according to a method for recirculation of exhaust gases of a combustion engine according to the present invention.

FIG. 1 depicts an arrangement for recirculation of exhaust gases of a supercharged combustion engine 1. The combustion engine 1 may be a diesel engine, an Otto engine or some other type of combustion engine. Such recirculation is usually called EGR (Exhaust Gas Recirculation). Adding exhaust gases to the compressed air which is led to the engine's cylinders lowers the combustion temperature and hence also the content of nitrogen oxides ($NO_x$) which are formed during the combustion processes. The combustion engine 1 may be intended to power a heavy vehicle. The exhaust gases from the cylinders of the combustion engine 1 are led via an exhaust manifold 2 to an exhaust line 3. The exhaust gases in this exhaust line 3, which are at above atmospheric pressure, are led to a turbine 4. The turbine 4 is thus provided with driving power which is transferred, via a connection, to a compressor 5. The compressor 5 draws ambient air into an inlet line 7 via an air filter 6. The air is compressed by the compressor 5, thereby imparting to it an above atmospheric pressure and a temperature rise which is proportional to the extra pressure applied. The compressed air is led to a charge air cooler 8 in which it is cooled by ambient air. The air flow through the charge air cooler 8 is caused by a radiator fan 9 which is driven by the combustion engine 1 by means of a suitable connection.

An arrangement for effecting recirculation of part of the exhaust gases in the exhaust line 3 comprises a return line 10 which extends between the exhaust line 3 and the inlet line 7. The arrangement comprises flow means by which it is possible to regulate the flow of exhaust gases through the return line 10. Said flow means are here exemplified in the form of an EGR valve 11. The EGR valve 11 may comprise a damper which can be adjusted to a variable degree of openness so that the flow of exhaust gases through the return line 10 can be varied substantially steplessly between nil and a maximum value. An electrical control unit 12 is adapted to controlling the EGR valve 11 on the basis of information about the current operating state of the combustion engine 1 so that a desired amount of exhaust gases is returned through the return line 10. The control unit 12 may be a computer unit provided with suitable software 12a for this purpose. The return line 10 comprises an EGR cooler 13 for cooling the returning exhaust gases. In supercharged diesel engines 1, the pressure of the exhaust gases in the exhaust line 3 in certain operating situations will be lower than the pressure of the compressed air in the inlet line 7. In such operating situations it is not possible to mix the exhaust gases in the return line 10 directly with the compressed air in the inlet line without special auxiliary means. To this end it is possible to use, for example, a venturi 14. If the combustion engine is instead a supercharged Otto engine, the exhaust gases in the return line 10 can usually be mixed directly with the air in the inlet line 7, since the exhaust gases in the exhaust line of an Otto engine in substantially all operating situations will be at a higher pressure than the compressed air in the inlet line 7. When the returning exhaust gases have mixed with the compressed air in the inlet line 7, the mixture is led via a manifold 15 to the respective combustion spaces of the combustion engine 1.

The combustion engine 1 is cooled in the conventional manner by a cooling system containing a coolant which is circulated by a coolant pump 16. The cooling system also comprises a thermostat 17 and a radiator 18. When the temperature of the coolant is too low, the thermostat 17 leads coolant back to the combustion engine 1 without its passing through the radiator 18. The radiator 18 is situated behind the charge air cooler 8 in a forward region of the vehicle through which ambient air flows. The coolant in the cooling system is used for cooling the returning exhaust gases in the EGR cooler 13. A temperature sensor 19 is applied in the cooling system to measure the temperature T of the coolant when it is led out from the combustion engine 1. The temperature sensor 19 is adapted to sending to the control unit 12 a signal representing measured temperature values T. By maneuvering a control valve 20 it is possible for part of the coolant in the cooling system to be used for heating purposes. When the control valve 20 is open, part of the coolant is led via a line 21 to a heat exchanger 22. In the heat exchanger 22, the coolant gives off heat for heating, for example, the cab space of a vehicle. After passing through the heat exchanger 22, the coolant is led, inter alia via a line 23 and the pump 16, to the combustion engine 1. The coolant in the cooling system is thus subjected to heating when it cools the combustion engine 1 and when it cools the exhaust gases in the EGR cooler 13. The coolant gives off heat in the heat exchanger 22 and in the radiator 8.

When a combustion engine is to be started up after a relatively long period switched off, the coolant in the cooling system will be at a temperature substantially corresponding to the ambient temperature. However, the coolant needs to be at an operating temperature, which may be in the range 80-100° C., when it is led through the combustion engine if the combustion engine 1 is to be provided with optimum operating conditions. In situations of cold ambient temperature, it is also desirable that the coolant be heated up quickly so that it can be used as a heat source for heating the cab space in the vehicle. When the combustion engine is run in a cold environment and/or during operating periods at low load, it may also be difficult to maintain a desired coolant temperature. The object of the arrangement described above is to ensure that when the coolant temperature T is too low extra heat is supplied to the coolant by returning an increased amount of exhaust gases through the EGR cooler 13.

Figure 2:
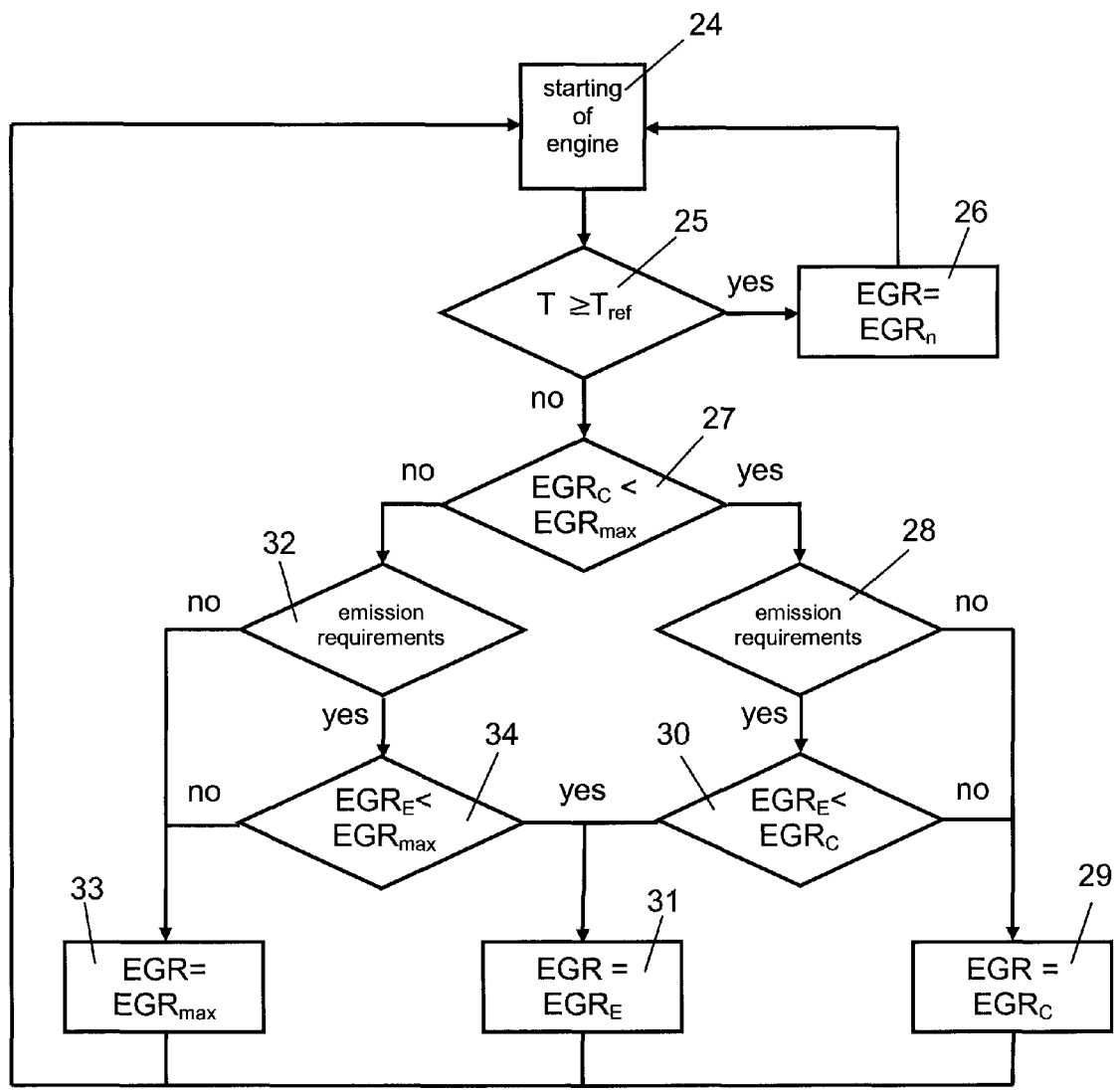

FIG. 2 depicts a flowchart illustrating an embodiment of a method according to the invention. It thus also illustrates how the arrangement in FIG. 1 may work. The process begins at step 24. The beginning of the process may for example take the form of the starting of the combustion engine 1. To ascertain whether the coolant in the cooling system is at too low a temperature, the control unit 12 receives information from the temperature sensor 19 about the temperature T of the coolant leaving the combustion engine 1. To this end, the control unit 12 is adapted to comparing the measured temperature T of the coolant with a reference temperature $T_{ref}$ which corresponds to the lowest temperature which the coolant should be at when it is led out from the combustion engine. The reference temperature $T_{ref}$ is with advantage stored in the control unit 12. At step 25, the control unit 12 decides whether the coolant is at an acceptable temperature T or not. If the temperature T of the coolant is equal to or greater than the reference temperature $T_{ref}$, the coolant is deemed to be at an acceptable temperature, in which case no extra supply of exhaust gases through the return line need be initiated. The control unit 12 may during operation receive information about relevant operating parameters of the combustion engine 1 such as, for example, its load and speed. On the basis of that information, the control unit 12 determines the amount of exhaust gases $EGR_n$ which has to be returned through the return line in order to achieve good combustion with simultaneous optimum reduction of the emissions of nitrogen oxides $NO_x$. At step 26, the control unit 12 initiates an adjustment of the degree of openness of the EGR valve 11 so that said amount of exhaust gases $EGR_n$ is returned through the return line 10. Thereafter the process begins again at step 24.

If instead the temperature T of the coolant is lower than the reference temperature $T_{ref}$, the control unit 12 finds, at step 25, that the coolant needs to be provided with extra heat. In this case, the control unit 12 has to ascertain how much the amount of exhaust gases passing through the EGR cooler 13 can be increased in order as quickly as possible to raise the temperature of the coolant to an acceptable level. To this end, the control unit 12 estimates the largest amount of exhaust gases $EGR_C$ which can be returned without adversely affecting the combustion process. The control unit 12 also estimates the maximum possible amount of exhaust gases $EGR_{max}$ which can be returned with a fully open EGR valve 11 in the prevailing operating situation. At step 27, the control unit 12 does a comparison to see whether the estimated amount of exhaust gases $EGR_C$ which can be returned without adversely affecting the combustion process is smaller than the maximum amount of exhaust gases $EGR_{max}$ which can be led through the EGR valve 11. If the control unit 12 finds that $EGR_C$ is smaller than $EGR_{max}$, the EGR valve 11 should not be fully opened but be adjusted to a degree of openness such that the amount of exhaust gases $EGR_C$ is returned to the return line 10. In certain types of operating situations, such as when the combustion engine is cold and/or there is a cold ambient temperature, the emission requirements normally applicable need not always be met. At step 28, the control unit 12 determines whether the prevailing operating situation allows an exception from emission requirements. At step 29, if emission requirements do not apply, the control unit 12 adjusts the EGR valve 11 to a degree of openness such that the amount of exhaust gases $EGR_C$ is returned through the return line 10. If on the other hand emission requirements do apply, the control unit 12 determines how large an amount of exhaust gases $EGR_E$ can be returned through the EGR valve while meeting the emission requirements. Thereafter, at step 30, the control unit 12 does a comparison to see whether the amount of exhaust gases $EGR_E$ which meets the emission requirements is smaller than the amount of exhaust gases $EGR_C$ which can be returned without adversely affecting the combustion process. For both the requirement of good combustion and the emission requirements to be met, the only amount of exhaust gases which can be returned through the return line 10 is that corresponding to the smaller of said exhaust gas amount values $EGR_E$, $EGR_C$. At step 31, if $EGR_E$ is smaller than $EGR_C$, the control unit 12 adjusts the EGR valve to a degree of openness such that the amount of exhaust gases $EGR_E$ is returned through the return line 10. Otherwise, at step 29, the control unit 12 adjusts the EGR valve to a degree of openness such that the amount of exhaust gases $EGR_C$ is returned through the return line 10. Thereafter the process begins again at step 24.

If instead the control unit 12 finds, at step 27, that the estimated amount of exhaust gases $EGR_C$ is equal to or greater than the maximum possible amount of exhaust gases $EGR_{max}$ which can be returned with a fully open EGR valve 11, the estimated amount of exhaust gases $EGR_C$ does not constitute a limitation. At step 32, the control unit 12 determines whether the operating situation is such as to allow an exception from the normally applicable emission requirements. At step 33, if the emission requirements do not apply, the control unit 12 fully opens the EGR valve 11 so that the maximum amount of exhaust gases $EGR_{max}$ is returned through the return line 10. If on the other hand the emission requirements do apply, the control unit 12 determines how large an amount of exhaust gases $EGR_E$ can be returned through the EGR cooler while meeting the emission requirements. Thereafter, at step 34, the control unit 12 does a comparison to see whether the amount of exhaust gases $EGR_E$ is smaller than the maximum possible amount of exhaust gases $EGR_{max}$. At step 31, if $EGR_E$ is smaller than the maximum possible amount of exhaust gases $EGR_{max}$, the control unit 12 adjusts the EGR valve to a degree of openness such that the amount of exhaust gases $EGR_E$ is returned through the return line 10. Thereafter the process begins again at step 24. Otherwise, at step 33, the control unit 12 fully opens the EGR valve so that the maximum possible amount of exhaust gases $EGR_{max}$ is returned through the return line 10. Thereafter the process begins again at step 24.

According to the method described above, an extra amount of exhaust gases is thus supplied through the return line whenever the temperature of the coolant is too low. The result is rapid heating of the coolant to an acceptable level. After engine start-up, the coolant can thus reach its operating temperature very quickly, thereby promoting the operation of the combustion engine and enabling rapid heating of a vehicle's cab space. The arrangement and method according to the invention also prevent the temperature of the coolant from falling below an acceptable level when the combustion engine is running at low load in a cold environment.

The invention is in no way limited to the embodiments illustrated in the drawing but may be varied freely within the scopes of the claims. The case described above involves the use of flow means in the form of an EGR valve 11 which comprises an adjustable damper for regulating the amount of exhaust gases passing through the return line 10. Said flow means may of course comprise other types of flow-regulating components such as a so-called waste-gate valve, a turbo-charger with variable geometry or a variable venturi or combinations of suitable components.

The invention claimed is:

1. An arrangement for recirculation of exhaust gases of a combustion engine, the arrangement comprising
    an air inlet line which supplies air to the combustion engine,
    an exhaust line which leads exhaust gases out from the combustion engine,
    a return line extending from the exhaust line to the inlet line to supply and returned exhaust gases to the combustion engine;
    a flow control comprising an EGR-valve operable to regulate the amount of exhaust gases led through the return line and
    a control unit operable to control the EGR-valve; and
    an EGR cooler in the return line and operable to cool the exhaust gases in the return line by a coolant which is used in a cooling system for cooling the combustion engine;
    a temperature sensor operable to detect the coolant temperature at a point in the cooling system, the control unit being operable to receive information from the temperature sensor concerning the coolant temperature (T), and to decide whether the coolant in the cooling system is at a too low temperature, the control unit being operable to control the EGR-valve so that a larger amount of exhaust gases is led through the return line and the EGR cooler to the inlet line if the coolant in the cooling system is at a too low temperature.

2. An arrangement according to claim 1, wherein the control unit controls the flow control so that the larger amount of exhaust gases is led through the return line until the coolant in the cooling system has risen to a predetermined temperature.

3. An arrangement according to claim 1, wherein the control unit controls the flow control so that the larger amount of exhaust gases is limited to a maximum amount of exhaust gases ($EGR_{max}$) which the flow control is capable, in a then prevailing operating situation, of enabling to pass through the return line.

4. An arrangement according to claim 1, the control unit controls the flow control so that the larger amount of exhaust gases is limited to a maximum amount of exhaust gases ($EGR_E$) which it is possible to return via the return line, in a then prevailing operating situation, without exceeding a predetermined emission requirement of the combustion engine.

5. An arrangement according to claim 1, wherein the control unit is operable to estimate whether the coolant is at a too low temperature by comparing the temperature value (T) received from the temperature sensor with a reference temperature value ($T_{ref}$).

6. An arrangement according to claim 1, wherein the control unit controls the flow control so that the larger amount of exhaust gases is limited to a maximum amount of exhaust gases ($EGR_C$) which it is possible to return through the return line, in the prevailing operating situation, without adversely affecting a combustion processes in the combustion engine.

7. An arrangement according to claim 6, further comprising the control unit controls the flow control so that the larger amount of exhaust gases is limited to a maximum amount of exhaust gases ($EGR_E$) which it is possible to return via the return line, in a then prevailing operating situation, without exceeding a predetermined emission requirement.

8. A method for recirculation of exhaust gases of a combustion engine, using a recirculation arrangement comprising an air inlet line which supplies air to the combustion engine,
    an exhaust line which leads exhaust gases out from the combustion engine,
    a return line extending from the exhaust line to the inlet line to supply and returned exhaust gases to the combustion engine;
    a flow control comprising an EGR-valve operable to regulate the amount of exhaust gases led through the return line, and
    a control unit operable to control the EGR-valve;
    an EGR cooler in the return line and operable to cool the exhaust gases in the return line by a coolant which is used in a cooling system for cooling the combustion engine;
    a temperature sensor operable to detect the coolant temperature at a point in the cooling system,
    the method comprising receiving information from the temperature sensor concerning the coolant temperature (T) and then deciding whether the received information shows that the coolant in the cooling system is at a too low temperature, and
    controlling the EGR-valve so that a larger amount of exhaust gases is led through the return line and the EGR cooler to the said inlet line if the received information shows that the coolant in the cooling system is at a too low temperature.

9. A method according to claim 8, wherein the step of leading the larger amount of exhaust gases through the return line leads the exhaust gases until the coolant in the cooling system has reached a temperature acceptable to the control unit.

10. A method according to claim 8, wherein the step of controlling the flow control so that the larger amount of exhaust gases is limited to a maximum amount of exhaust gases ($EGR_{max}$) which the flow control is capable, in the then prevailing operating situation, of leading through the return line.

11. A method according to claim 8, wherein the step of controlling the flow so that the larger amount of exhaust gases is for limiting the maximum amount of exhaust gases ($EGR_E$) which it is possible to return, in the then prevailing operating situation, without exceeding a predetermined emission requirement.

12. A method according to claim 8, further comprising estimating whether the coolant is at too low a temperature by comparing the temperature value (T) received from the temperature sensor with a reference temperature value ($T_{ref}$).

13. A method according to claim according to claim 8, wherein the step of controlling the flow so that the larger amount of exhaust gases is the maximum amount of exhaust gases ($EGR_C$) which it is possible to return, in the then prevailing operating situation, without adversely affecting a combustion processes in the combustion engine.

14. A method according to claim 13, wherein the step of controlling the flow further comprises the step of controlling the flow so that the larger amount of exhaust gases is for limiting the maximum amount of exhaust gases ($EGR_e$) which it is possible to return, in the then prevailing operating situation, without exceeding a predetermined emission requirement.

\* \* \* \* \*